(12) United States Patent
Chou et al.

(10) Patent No.: US 9,877,248 B2
(45) Date of Patent: Jan. 23, 2018

(54) METHODS FOR EFFICIENT WIRELESS COMMUNICATIONS AND COMMUNICATION APPARATUS UTILIZING THE SAME

(71) Applicant: MediaTek Inc., Hsin-Chu (TW)

(72) Inventors: Shuang-An Chou, Keelung (TW); Hsu-Chieh Hu, Taipei (TW)

(73) Assignee: MEDIATEK INC., Hsin-Chu (TW)

( * ) Notice: Subject to any disclaimer, the term of this patent is extended or adjusted under 35 U.S.C. 154(b) by 0 days.

(21) Appl. No.: 15/678,339

(22) Filed: Aug. 16, 2017

(65) Prior Publication Data

US 2017/0347300 A1 Nov. 30, 2017

Related U.S. Application Data

(60) Division of application No. 15/006,375, filed on Jan. 26, 2016, now Pat. No. 9,775,083, which is a continuation-in-part of application No. 13/974,456, filed on Aug. 23, 2013, now Pat. No. 9,258,752.

(51) Int. Cl.
| | |
|---|---|
| *H04W 36/04* | (2009.01) |
| *H04W 36/00* | (2009.01) |
| *H04W 24/10* | (2009.01) |
| *H04W 36/30* | (2009.01) |
| *H04L 12/26* | (2006.01) |

(52) U.S. Cl.
CPC ............. *H04W 36/04* (2013.01); *H04L 43/16* (2013.01); *H04W 24/10* (2013.01); *H04W 36/0088* (2013.01); *H04W 36/30* (2013.01)

(58) Field of Classification Search
CPC . H04W 36/04; H04W 36/30; H04W 36/0088; H04W 24/10; H04L 43/16
See application file for complete search history.

(56) References Cited

U.S. PATENT DOCUMENTS

| | | | |
|---|---|---|---|
| 8,364,156 B2 | 1/2013 | Chun et al. | |
| 9,008,659 B1 * | 4/2015 | Choi | H04W 36/04 370/331 |
| 9,526,052 B2 * | 12/2016 | Jiang | H04W 36/24 |

(Continued)

FOREIGN PATENT DOCUMENTS

WO   WO 2013/051837 A1   4/2013

*Primary Examiner* — Nathan Mitchell
(74) *Attorney, Agent, or Firm* — McClure, Qualey & Rodack, LLP

(57) ABSTRACT

A communications apparatus and method for camping on a serving cell. The apparatus includes a radio frequency (RF) signal processing device, processing a plurality of RF signals to generate a plurality of baseband signals, a baseband signal processing device, processing the baseband signals, and a processor, measuring a signal quality or power of the serving cell and determining whether a first predetermined threshold value related to cell reselection of the serving cell is greater than a second predetermined threshold value related to cell reselection of a predetermined neighbor cell. When the first predetermined threshold value is greater than the second predetermined threshold value, the processor further determines whether the signal quality or power of the serving cell is greater than the second predetermined threshold value. Also, at times, the processor further determines whether to perform cell measurement on the predetermined neighbor cell.

6 Claims, 13 Drawing Sheets

(56) References Cited

U.S. PATENT DOCUMENTS

| | | |
|---|---|---|
| 2009/0191862 A1 | 7/2009 | Amirijoo et al. |
| 2010/0222055 A1 | 9/2010 | Cho et al. |
| 2013/0017832 A1* | 1/2013 | Suzuki .............. H04W 36/0083 455/436 |
| 2013/0210441 A1 | 8/2013 | Nader |
| 2013/0237266 A1 | 9/2013 | Futaki |
| 2013/0244657 A1 | 9/2013 | Wang et al. |
| 2013/0244664 A1 | 9/2013 | Song et al. |
| 2014/0242993 A1* | 8/2014 | Dahlen ................ H04W 36/30 455/436 |
| 2015/0327133 A1* | 11/2015 | Yiu ...................... H04W 48/20 455/436 |
| 2016/0014666 A1* | 1/2016 | Muller ................. H04W 36/30 455/436 |
| 2016/0286445 A1* | 9/2016 | Jung .................... H04W 36/06 |
| 2016/0286454 A1* | 9/2016 | Mager ............... H04W 36/0088 |

* cited by examiner

METHODS FOR EFFICIENT WIRELESS COMMUNICATIONS AND COMMUNICATION APPARATUS UTILIZING THE SAME

CROSS REFERENCE TO RELATED APPLICATIONS

This application is a Divisional of pending U.S. patent application Ser. No. 15/006,375, filed on Jan. 26, 2016, which is a Continuation-In-Part of U.S. patent application Ser. No. 13/974,456, filed Aug. 23, 2013 (now U.S. Pat. No. 9,258,752, issued Feb. 9, 2016) and entitled "Methods for Determining Whether to Perform Cell Measurement on a Predetermined Neighbor Cell and for Ping-Pong Avoidance During Cell Reselection and Communication Apparatus Utilizing the Same," the entireties of which are incorporated herein by reference.

BACKGROUND OF THE INVENTION

Field of the Invention

The invention relates to intelligent cell measurement and reselection, and more particularly to priority-based intelligent cell measurement and reselection.

Description of the Related Art

The term "wireless", normally refers to an electrical or electronic operation, which is accomplished without the use of a "hard wired" connection. "Wireless communications", is the transfer of information over a distance without the use of electrical conductors or wires. The distances involved may be short (a few meters for television remote controls) or very long (thousands or even millions of kilometers for radio communications). The best known example of wireless communications is the cellular telephone. Cellular telephones use radio waves to enable an operator to make phone calls to another party, from many locations world-wide. They can be used anywhere, as long as there is a cellular telephone site to house equipment that can transmit and receive signals, which are processed to transfer both voice and data to and from the cellular telephones.

There are various well-developed and well-defined cellular communications technologies. For example, the Global System for Mobile communications (GSM) is a well-defined and commonly adopted communications system, which uses time division multiple access (TDMA) technology, which is a multiplex access scheme for digital radio, to send voice, data, and signalling data (such as a dialed telephone number) between mobile phones and cell sites. The CDMA2000 is a hybrid mobile communications 2.5G/3G (generation) technology standard that uses code division multiple access (CDMA) technology. The UMTS (Universal Mobile Telecommunications System) is a 3G mobile communications system, which provides an enhanced range of multimedia services over the GSM system. The Wireless Fidelity (Wi-Fi) is a technology defined by the 802.11 engineering standard and can be used for home networks, mobile phones, video games, to provide a high-frequency wireless local area network. The LTE (Long Term Evolution) and the LTE-Advanced evolved from the LTE is a 4G mobile communications system, which provides a high-speed data transmission over the 2G and 3G system.

BRIEF SUMMARY OF THE INVENTION

Communications apparatus and methods for efficient wireless communications are provided. An exemplary embodiment of a communications apparatus camping on a serving cell comprises a radio frequency (RF) signal processing device, processing a plurality of RF signals to generate a plurality of baseband signals; a baseband signal processing device, processing the baseband signals; and a processor, measuring a signal quality or power of the serving cell and determining whether a first predetermined threshold value related to cell reselection of the serving cell is greater than a second predetermined threshold value related to cell reselection of a predetermined neighbor cell. T the first predetermined threshold value is greater than the second predetermined threshold value, the processor further determines whether the signal quality or power of the serving cell is greater than the second predetermined threshold value. Also, when the signal quality or power of the serving cell is not greater than the second predetermined threshold value, the processor further determines whether to perform cell measurement on the predetermined neighbor cell.

An exemplary embodiment of a method for efficient wireless communications comprises measuring a signal quality or power of the serving cell; and determining whether a first predetermined threshold value related to cell reselection is greater than a second predetermined threshold value related to cell reselection of a predetermined neighbor cell. When the first predetermined threshold value is greater than the second predetermined threshold value, the method further comprises: determining whether the signal quality or power of the serving cell is greater than the second predetermined threshold value; and determining whether to perform cell measurement on the predetermined neighbor cell when the signal quality or power of the serving cell is not greater than the second predetermined threshold value. A detailed description is given in the following embodiments with reference to the accompanying drawings.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
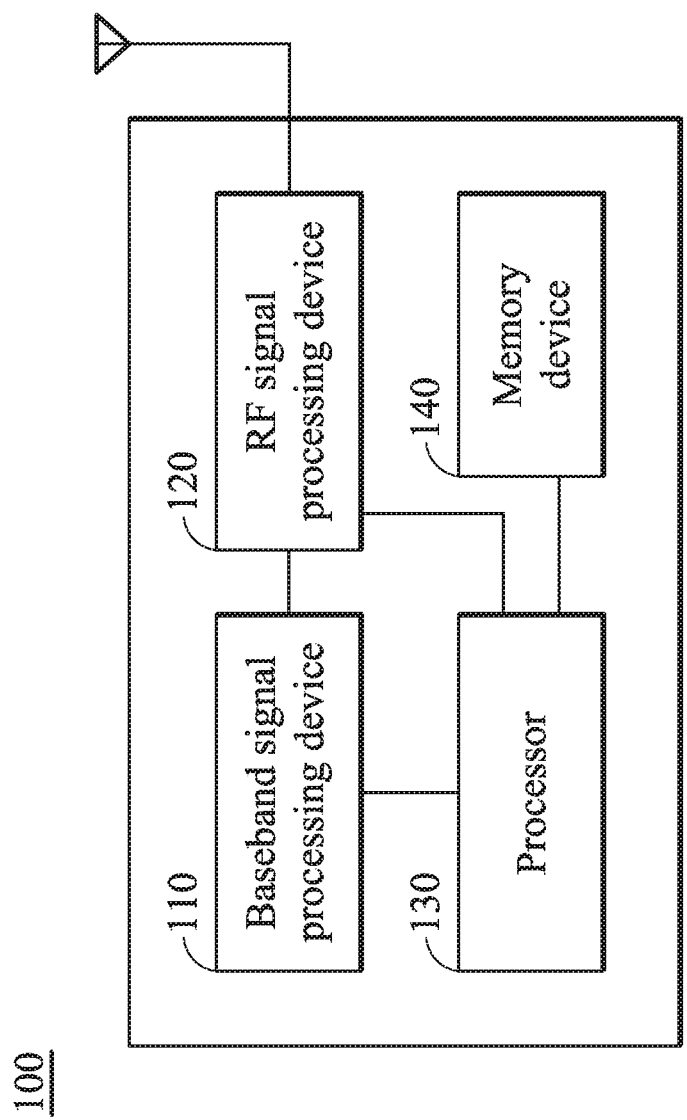
FIG. 1 shows a block diagram of a communications apparatus according to an embodiment of the invention.

FIG. 1 shows a block diagram of a communications apparatus according to an embodiment of the invention. The communications apparatus 100 may be a notebook, a cellular phone, a portable gaming device, a portable multimedia player, a Global Positioning System (GPS), a receiver, a personal digital assistant, a tablet computer, or another such device. The communications apparatus 100 may comprise at least a baseband signal processing device 110, a radio frequency (RF) signal processing device 120, a processor 130, a memory device 140, and an antenna module comprising at least one antenna. Note that, in order to clarify the concept of the invention, FIG. 1 presents a simplified block diagram in which only the elements relevant to the invention are shown. However, the invention should not be limited to what is shown in FIG. 1.

The RF signal processing device 120 may receive RF signals via the antenna and process the received RF signals to convert the received RF signals to baseband signals to be processed by the baseband signal processing device 110, or receive baseband signals from the baseband signal processing device 110 and convert the received baseband signals to RF signals to be transmitted to a peer communications apparatus. The peer communications apparatus may be, for example but is not limited to, a base station, an eNode B, an access point, or other such devices in the wireless network. The RF signal processing device 120 may comprise a plurality of hardware elements to perform radio frequency conversion. For example, the RF signal processing device 120 may comprise a power amplifier, a mixer, or others.

The baseband signal processing device 110 may further process the baseband signals to obtain information or data transmitted by the peer communications apparatus, such as the system information carried by the peer communications apparatus in the RF signals. The baseband signal processing device 110 may also comprise a plurality of hardware elements to perform baseband signal processing. The baseband signal processing may comprise analog-to-digital conversion (ADC)/digital-to-analog conversion (DAC), gain adjustment, modulation/demodulation, encoding/decoding, and so on.

The processor 130 may control the operations of the baseband signal processing device 110 and the RF signal processing device 120. According to an embodiment of the invention, the processor 130 may also be arranged to execute the program codes of the software module(s) of the corresponding baseband signal processing device 110 and/or the RF signal processing device 120. The program codes accompanied with specific data in a data structure may also be referred to as a processor logic unit or a stack instance when being executed. Therefore, the processor may be regarded as comprising a plurality of processor logic units, each for executing one or more specific functions or tasks of the corresponding software module(s). The memory device 140 may store the software and firmware program codes, system data, user data, etc. of the communications apparatus 100.

According to an embodiment of the invention, the RF signal processing device 120 and the baseband signal processing device 110 may be collectively regarded as a radio module capable of communicating with a wireless network to provide wireless communications services in compliance with a predetermined Radio Access Technology (RAT). Note that, in some embodiments of the invention, the communications apparatus 100 may further be extended to comprise more than one antenna and/or more than one radio module, and the invention should not be limited to what is shown in FIG. 1.

In addition, in some embodiments of the invention, the processor may be configured inside of the baseband signal processing device 110, or the communications apparatus 100 may comprise another processor configured inside of the baseband signal processing device 110. Thus the invention should not be limited to the architecture as shown in FIG. 1.

Generally, a public land mobile network (PLMN) may support multiple frequencies, and each frequency may contain one or more cells. In addition, each frequency may have a corresponding reselection priority for one cell and the communications apparatus 100 may obtain information regarding the corresponding reselection priority of one or more frequencies from the system information provided by the cell. The cell may be a serving cell that the communications apparatus 100 currently camped on or one or more neighbor cells of the communications apparatus 100.

However, when performing cell measurement, the communications standards do not explicitly specify whether to measure a low priority cell when the serving signal is good enough. Here, the low priority cell is a cell on a frequency having a reselection priority lower than that of the frequency of the serving cell.

To be more specific, the communications standards only specify that cell measurement on a low priority cell must be performed when the signal quality or the signal power of the serving cell is not greater than a predetermined threshold value related to cell measurement (that is, the second predetermined threshold value as discussed below), and do not explicitly specify whether the cell measurement on the low priority cell have to be perform or not when the signal quality or the signal power of the serving cell is greater than the predetermined threshold value related to cell measurement. In addition, there is no rule or algorithm defined in the communications standards for the communications apparatus 100 to determine whether to perform the cell measurement on the low priority cell when the signal quality or the signal power of the serving cell is greater than the predetermined threshold value related to cell measurement.

Therefore, in order to enhance the efficiency of performing cell measurement and further triggering cell reselection, methods for determining whether to perform cell measurement on a low priority cell and methods for ping-pong avoidance during cell reselection will be provided and illustrated in detail in the following paragraphs.

According to an embodiment of the invention, the processor 130 may determine to perform cell measurement on a low priority cell when a first predetermined threshold value related to cell reselection is greater than a second predetermined threshold value related to cell measurement. The first predetermined threshold value related to cell reselection is a threshold value utilized for determining whether to reselect to a low priority cell. The second predetermined threshold value related to cell measurement is a threshold value utilized for determining whether to perform cell measurement on a low priority cell as described above. In addition, the first predetermined threshold value and the second predetermined threshold value can be the threshold values for signal quality or signal power.

According to an embodiment of the invention, the first predetermined threshold value and/or the second predetermined threshold value may be provided by the serving cell in the system information. The first predetermined threshold value and/or the second predetermined threshold value may be obtained from the currently received system information or may be obtained from the stored information that was learned from the system information previously received from the serving cell, and the invention should not be limited to either case.

Based on a concept of the invention, when the quality parameter is given, the processor 130 may determine to perform cell measurement on a low priority cell when the following equation Eq. (1) is satisfied.

$$\text{Search\_threshold\_for\_low\_priority\_}Q < \text{Serving\_signal\_threshold\_}Q \quad \text{Eq. (1)}$$

where the Serving_signal_threshold_Q and Search_threshold_for_low_priority_Q are threshold values for signal quality. When the quality parameter Serving_signal_threshold_Q is given, the Serving_signal_threshold_Q represents the first predetermined threshold value related to cell reselection, and Search_threshold_for_low_priority_Q represents the second predetermined threshold value related to cell measurement. The parameters Serving_signal_threshold_Q and Search_threshold_for_low_priority_Q may be provide by the serving cell.

On the other hand, when the quality parameter is not given, the processor 130 may determine to perform cell measurement on a low priority cell when the following equation Eq. (2) is satisfied.

$$\text{Search\_threshold\_for\_low\_priority\_}P < \text{Serving\_signal\_threshold\_}P \quad \text{Eq. (2)}$$

where the Serving_signal_threshold_P and Search_threshold_for_low_priority_P are threshold values for signal power. When the quality parameter Serving_signal_threshold_Q is not given, the Serving_signal_threshold_P represents the first predetermined threshold value related to cell reselection, and Search_threshold_for_low_priority_P represents the second predetermined threshold value related to cell measurement. The parameters Serving_signal_threshold_P and Search_threshold_for_low_priority_P may be provide by the serving cell.

The reason for performing cell measurement on a low priority cell when the equation Eq. (1)/Eq. (2) is satisfied is that, a cell reselection procedure for reselecting to a low priority cell will be triggered only when the signal quality/signal power of the low priority cell is good enough and the signal quality/signal power of the serving cell is bad enough. In other words, even if the low priority cell is measured and determined as good enough, a following cell reselection procedure will not be triggered when the signal quality/signal power of the serving cell is determined as not bad enough. Therefore, when it is determined that it is impossible for a subsequent cell reselection procedure to reselect to a low priority cell to be triggered, there is no need to perform cell measurement on the low priority cell.

Suppose that Squal represents the signal quality of the serving cell measured by the communications apparatus and Srxlev represents the signal power of the serving cell measured by the communications apparatus. The signal quality/signal power of the serving cell is determined as bad enough to trigger a cell reselection to reselect to a low priority cell when:

$$\text{Squal} < \text{Serving\_signal\_threshold\_}Q \text{ (when the quality parameter is given)} \quad \text{Eq. (3)}$$

or $$\text{Srxlev} < \text{Serving\_signal\_threshold\_}P \text{ (when the quality parameter is not given)} \quad \text{Eq. (4)}$$

In addition, as discussed above, whether to perform cell measurement on the low priority cell becomes an optional choice and does not explicitly specified in the communications standards when the signal quality or the signal power of the serving cell is greater than the threshold value of triggering a cell measurement on the low priority cell. That is, $$\text{Search\_threshold\_for\_low\_priority\_}Q < \text{Squal (when the quality parameter is given)} \quad \text{Eq. (5)}$$

or $$\text{Search\_threshold\_for\_low\_priority\_}P < \text{Srxlev (when the quality parameter is not given)} \quad \text{Eq. (6)}$$

Combining Eq. (3) with Eq. (5) and combining Eq. (4) with Eq. (6), the equations Eq. (1) and Eq. (2) are respectively obtained. Therefore, the processor 130 may determine to perform cell measurement on a low priority cell when the equation Eq. (1)/Eq. (2) is satisfied.

Figure 2:
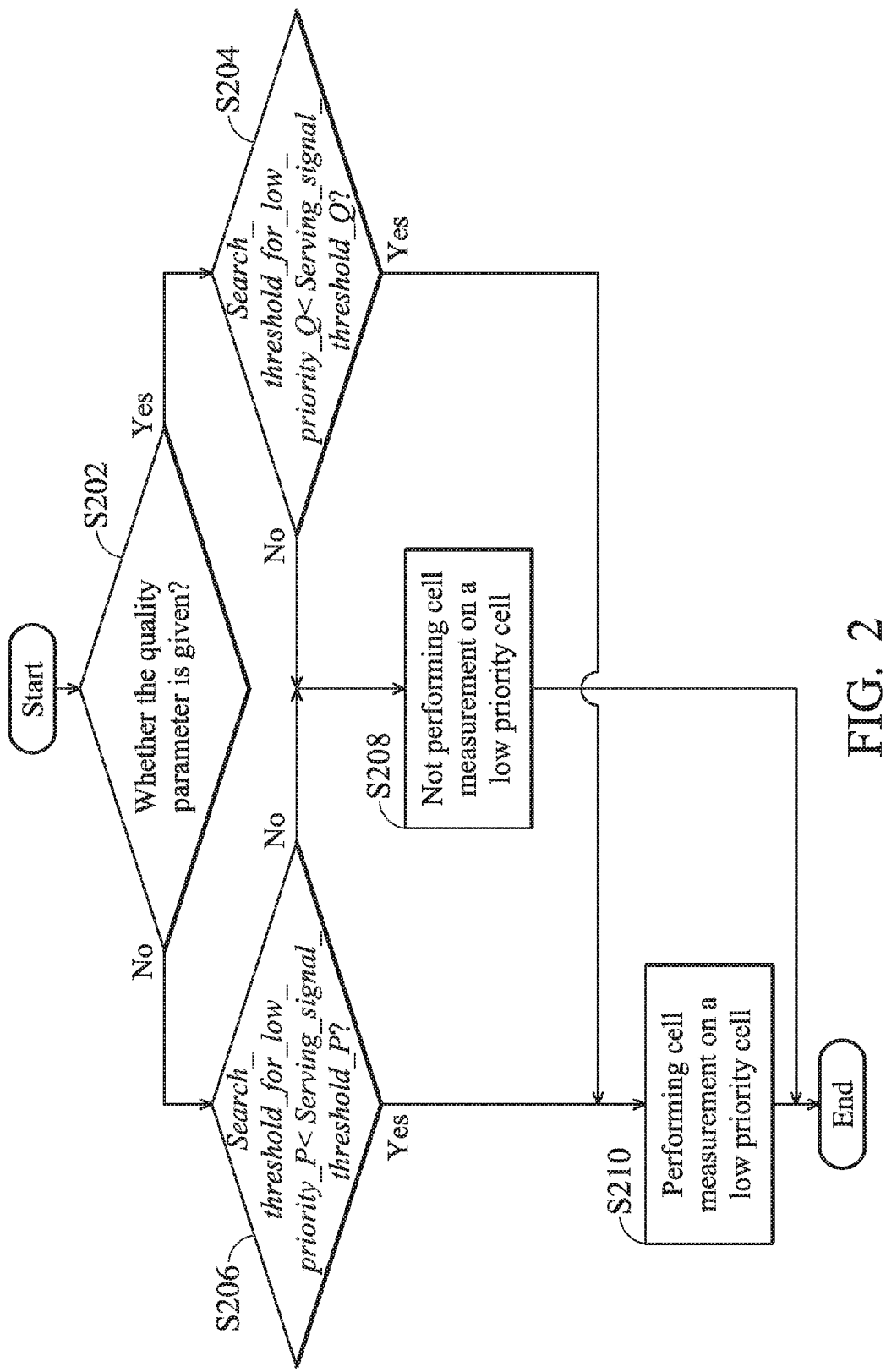
FIG. 2 shows a flow chart of a method for determining whether to perform cell measurement on a low priority cell according to an embodiment of the invention.

FIG. 2 shows a flow chart of a method for determining whether to perform cell measurement on a low priority cell according to an embodiment of the invention. When the processor 130 has to determine whether to perform cell measurement on a low priority cell, the processor 130 may first determine whether the quality parameter is given (Step S202). The quality parameter may be the threshold value of signal quality provided by the wireless network, such as the quality parameter Serving_signal_threshold_Q and/or Search_threshold_for_low_priority_Q as discussed above. When the quality parameter is given, the processor may further determine whether Search_threshold_for_low_priority_Q<Serving_signal_threshold_Q (Step S204). If so, the processor 130 may determine to perform cell measurement on a low priority cell (Step S210). If not, the processor 130 may determine not to perform cell measurement on a low priority cell (Step S208).

On the other hand, when the quality parameter is not given, the processor may determine whether Search_threshold_for_low_priority_P<Serving_signal_threshold_P (Step S206). If so, the processor 130 may determine to perform cell measurement on a low priority cell (Step S210). If not, the processor 130 may determine not to perform cell measurement on a low priority cell (Step S208).

According to an embodiment of the invention, information regarding one or more low priority cell(s) may be obtained from the serving cell or obtained from one or more neighbor cell records stored in the memory device 140. The neighbor cell records may be collected based on previous experience or preferred frequencies of the communications apparatus 100. In other words, information regarding which cell is a low priority cell is not limited to what is obtained from the serving cell, but also what is obtained from the information previously collected by the communications apparatus 100.

According to another embodiment of the invention, when it is determined that the first predetermined threshold value is greater than the second predetermined threshold, the processor 130 may further determine whether the communications apparatus 100 is moving at a high speed or a low speed, and when the communications apparatus 100 is moving at a high speed, the processor 130 performs the cell measurement on the low priority cell. The concept of determining whether to perform the cell measurement on the low priority cell further based on the moving speed of the communications apparatus 100 is that, when the communications apparatus 100 is moving at low speed or is static, the cell reselection is basically not required. Therefore, when the communications apparatus 100 is moving at low speed or is not moving, the processor 130 may determine not to perform the cell measurement on the low priority cell.

Figure 3:
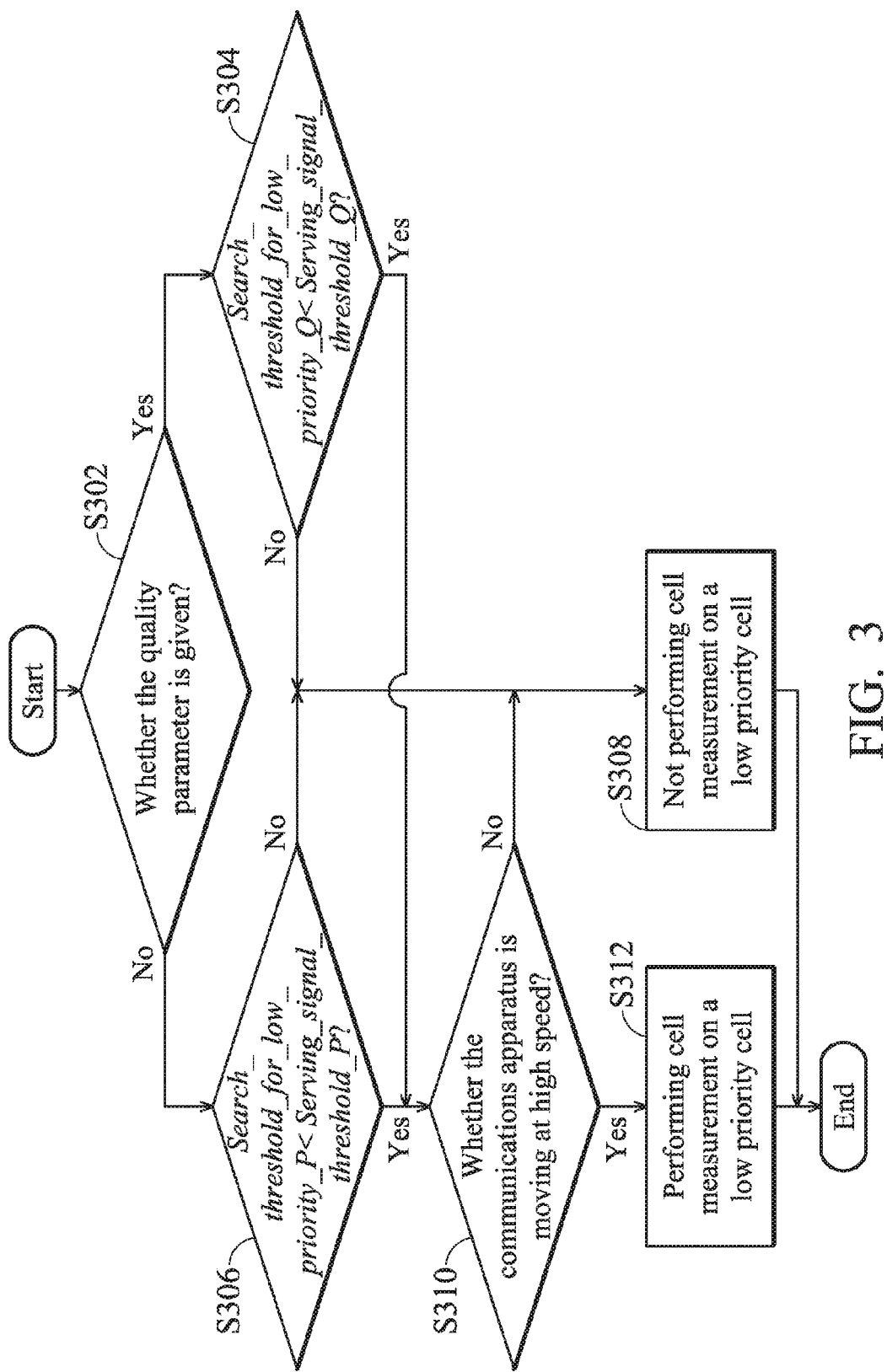
FIG. 3 shows a flow chart of a method for determining whether to perform cell measurement on a low priority cell according to another embodiment of the invention.

FIG. 3 shows a flow chart of a method for determining whether to perform cell measurement on a low priority cell according to another embodiment of the invention. When the processor has to determine whether to perform cell measurement on a low priority neighbor cell, the processor 130 may first determine whether the quality parameter is given (Step S302). The quality parameter may be the threshold value of signal quality provided by the wireless network as discussed above. When the quality parameter is given, the processor may further determine whether Search_threshold_for_low_priority_Q<Serving_signal_threshold_Q (Step S304). If not, the processor 130 may determine not to perform cell measurement on a low priority cell (Step S308). If so, the processor 130 may further determine whether the communications apparatus is moving at high speed (Step S310). If so, the processor 130 may determine to perform cell measurement on a low priority cell (Step S312). If not, the processor 130 may determine not to perform cell measurement on a low priority cell (Step S308).

On the other hand, when the quality parameter is not given, the processor may determine whether Search_threshold_for_low_priority_P<Serving_signal_threshold_P (Step S306). If not, the processor 130 may determine not to perform cell measurement on a low priority cell (Step S308). If so, the processor 130 may further determine whether the communications apparatus is moving at high speed (Step S310). If so, the processor 130 may determine to perform cell measurement on a low priority cell (Step S312). If not, the processor 130 may determine not to perform cell measurement on a low priority cell (Step S308).

Figure 4:
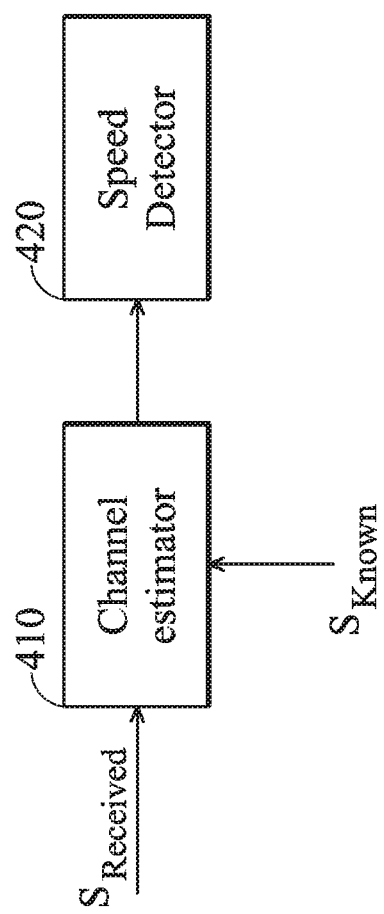
FIG. 4 shows a block diagram of an exemplary speed detection model according to an embodiment of the invention.

According to an embodiment of the invention, a speed of the communications apparatus 100 may be detected based on the received signals. FIG. 4 shows a block diagram of an exemplary speed detection model according to an embodiment of the invention. The channel estimator 410 may estimate the channel impulse response based on the known signal $S_{Known}$ and the received signal $S_{Received}$. According to an embodiment of the invention, the known signal may be a reference signal or pilot signal. Therefore, the communications apparatus 100 may monitor the reference signal or pilot channel to obtain the signals required for channel estimation. There are a variety of well-known methods and algorithms for estimating the channel impulse response, and the details are omitted here for brevity. When the channel impulse response is obtained, the speed detector 420 may further determine the moving speed of the communications apparatus 100 based on the estimated channel impulse response. There are a variety of well-known methods and algorithms for detecting speed based on the channel impulse response, and the details are omitted here for brevity.

In another aspect of the invention, methods for ping-pong avoidance during cell reselection will be provided. As discussed above, a cell reselection procedure for reselecting to a low priority cell will be triggered when some conditions well-known in the art are satisfied. For example, when the signal quality/signal power of the low priority cell is good enough and the signal quality/signal power of the serving cell is bad enough. However, when the communications apparatus 100 actually reselects to a low priority cell, the communications apparatus 100 may still reselect back to the original serving cell when some other conditions well-known in the art are satisfied, causing the ping-pong effect. Therefore, methods for ping-pong avoidance during cell reselection are required.

According to an embodiment of the invention, the processor 130 may further obtain a third threshold value related to cell reselection from a low priority neighbor cell (hereinafter called cell B) to achieve ping-pong avoidance. The third predetermined threshold value is a threshold value utilized for determining whether to reselect to a cell having a priority higher than that of the cell B. It is assumed that the priority planning and the S calculation parameters for each cell are the same. When the current serving cell (hereinafter called cell A) is on a frequency having a reselection priority higher than that of a frequency of the low priority neighbor cell (cell B), the cell A is a high priority neighbor cell to the cell B and the cell B is a low priority neighbor cell to cell A. Therefore, in the embodiments of invention, when considering the ping-pong effect, the first predetermined threshold value related to cell reselection to a low priority cell of cell A and the third predetermined threshold value related to cell reselection to a high priority cell of cell B are both required.

According to an embodiment of the invention, when the cell reselection conditions to reselect to a low priority cell as defined by the communications standards are all satisfied, the processor 130 may still determine not to perform the cell reselection when the first predetermined threshold value is greater than the third predetermined threshold value. The first predetermined threshold value may be provided by the serving cell (cell A) in the corresponding system information and the third predetermined threshold value may be provided by the low priority neighbor cell (cell B) in the corresponding system information. The first predetermined threshold value and/or the third predetermined threshold value may be obtained from the currently received system information or may be obtained from the stored information that was learned from the system information previously received from the corresponding cell, and the invention should not be limited to either case. For example, when the communications apparatus 100 currently camps on the cell A, the processor 130 may sniffer first to get the system information from the low priority neighbor cell B.

Based on a concept of the invention, when the quality parameter is given, the processor 130 may determine not to perform the cell reselection when the following equation Eq. (7) is satisfied.

$$\text{Threshold\_to\_reselect\_to\_higher\_priority\_}Q(\text{cell } B) < \text{Serving\_signal\_threshold\_}Q(\text{cell } A) \quad \text{Eq. (7)}$$

where the Serving_signal_threshold_Q and Threshold_to_reselect_to_higher_priority_Q are threshold values for signal quality and the cells specified in the parentheses represent from which cell the corresponding threshold value is obtained. When the quality parameter Serving_signal_threshold_Q is given, the Serving_signal_threshold_Q represents the first predetermined measurement-triggering threshold value related to cell reselection of cell A, and Threshold_to_reselect_to_higher_priority_Q represents the third predetermined threshold value related to cell reselection of cell B.

On the other hand, when the quality parameter is not given, the processor 130 may determine not to perform the cell reselection when the following equation Eq. (8) is satisfied.

$$\text{Threshold\_to\_reselect\_to\_higher\_priority\_}P(\text{cell } B) < \text{Serving\_signal\_threshold\_}P(\text{cell } A) \quad \text{Eq. (8)}$$

where the Serving_signal_threshold_P and Threshold_to_reselect_to_higher_priority_P are threshold values for signal power and the cells specified in the parentheses represent from which cell the corresponding threshold value is obtained. When the quality parameter Serving_signal_threshold_Q is not given, the Serving_signal_threshold_P represents the first predetermined threshold value related to cell reselection of cell A, and Threshold_to_reselect_to_higher_priority_P represents the third predetermined threshold value related to cell reselection of cell B.

In other words, when the equation Eq. (7)/Eq. (8) is not satisfied, the processor 130 may determine to perform the cell reselection to reselect to the cell B.

The reason for not performing cell reselection to reselect to a low priority cell when the equation Eq. (7)/Eq. (8) is not satisfied is that, a reselection ping-pong would occurred when the signal quality/signal power of cell A (the serving cell) is bad enough for cell A but not that bad enough for cell B.

Suppose that Squal represents the signal quality of the serving cell (cell A) measured by the communications apparatus and Srxlev represents the signal power of the serving cell (cell A) measured by the communications apparatus. The signal quality/signal power of the serving cell is determined as bad enough to trigger a cell reselection to reselect to a low priority cell when Eq. (3)/Eq. (4) as discussed above is satisfied.

In addition, if the communications apparatus actually reselects to the low priority cell B, the communications apparatus may further determine to reselect back to the cell A (that is, a high priority cell to cell B) when the following equation Eq. (9)/Eq. (10) is satisfied.

$$\text{Threshold\_to\_reselect\_to\_higher\_priority\_}Q(\text{cell } B) < \text{Squal (when the quality parameter is given)} \quad \text{Eq. (9)}$$

or $$\text{Threshold\_to\_reselect\_to\_higher\_priority\_}P(\text{cell } B) < \text{Srxlev (when the quality parameter is not given)} \quad \text{Eq. (10)}$$

When Eq. (3)/Eq. (4) and Eq. (9)/Eq. (10) are satisfied, the reselection ping-pong occurs. Combining Eq. (3) with Eq. (9) and combining Eq. (4) with Eq. (10), the equations Eq. (7) and Eq. (8) are respectively obtained. Therefore, in the embodiments of the invention, the processor 130 may determine not to perform cell reselection to reselect to a low priority cell when the equation Eq. (7)/Eq. (8) is satisfied.

Figure 5:
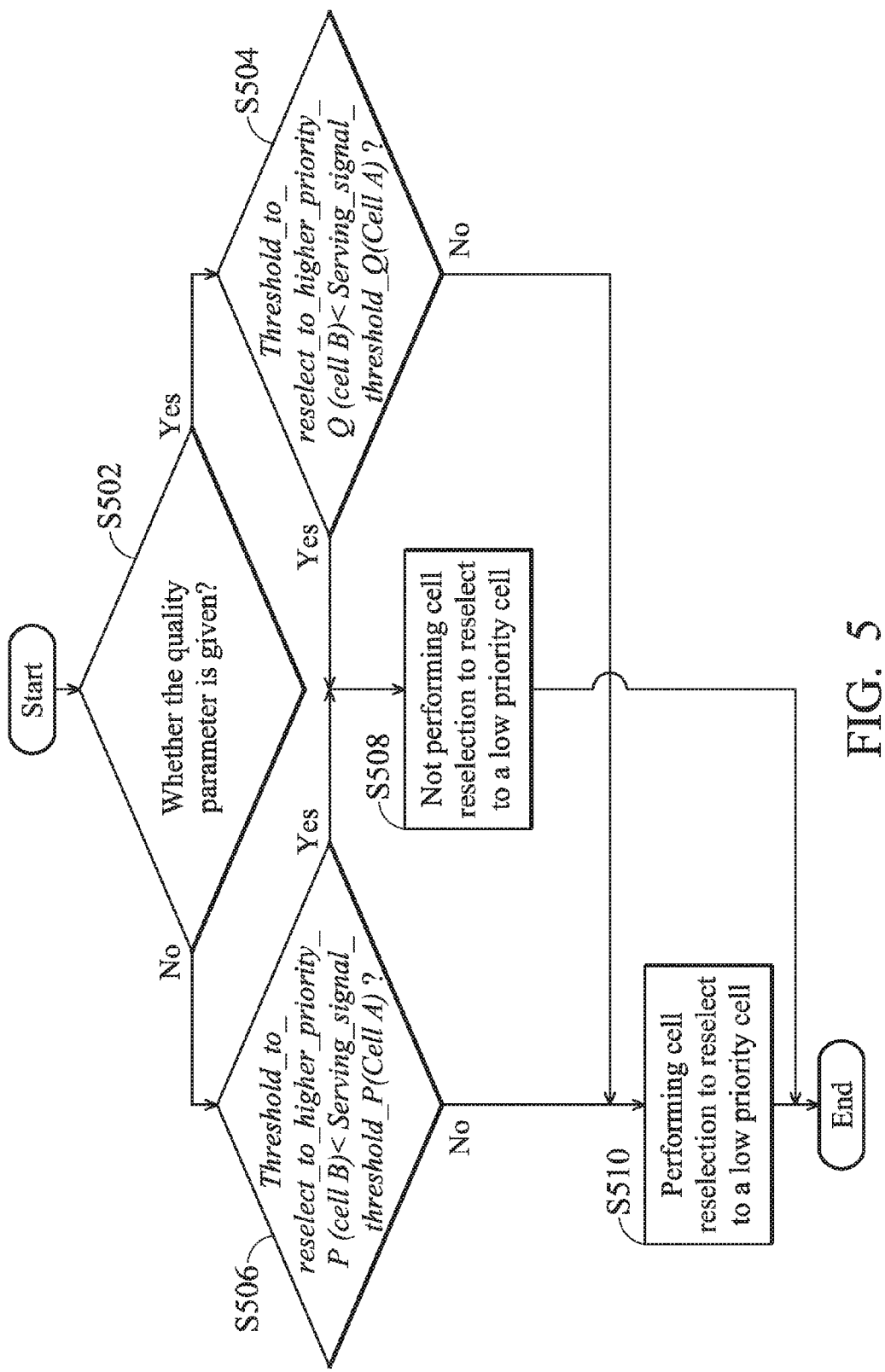
FIG. 5 shows a flow chart of a method for ping-pong avoidance during cell reselection according to an embodiment of the invention.

FIG. 5 shows a flow chart of a method for ping-pong avoidance during cell reselection according to an embodiment of the invention. When the cell reselection conditions to reselect to a low priority cell as defined by the communications standards are all satisfied, the processor 130 may further determine whether the quality parameter is given (Step S502). The quality parameter may be the threshold value of signal quality provided by the wireless network, such as the quality parameter Serving_signal_threshold_Q and/or Threshold_to_reselect_to_higher_priority_Q as discussed above. When the quality parameter is given, the processor may further determine whether Threshold_to_reselect_to_higher_priority_Q (cell B)<Serving_signal_threshold_Q(Cell A) (Step S504). If so, the processor 130 may determine not to perform cell reselection to reselect to a low priority cell (Step S508). If not, the processor 130 may determine to perform cell reselection to reselect to a low priority cell (Step S510).

On the other hand, when the quality parameter is not given, the processor may determine whether Threshold_to_reselect_to_higher_priority_P (cell B)<Serving_signal_threshold_P(Cell A) (Step S506). If so, the processor 130 may determine not to perform cell reselection to reselect to a low priority cell (Step S508). If not, the processor 130 may determine to perform cell reselection to reselect to a low priority cell (Step S510).

Based on the methods as described above, unnecessary cell measurement and cell reselection may be prevented, such that the battery power of the communications apparatus 100 can be greatly conserved and the undesired reselection ping-pong can be avoided.

With advances in communications techniques, communications apparatuses, such as mobile stations (MS, which may be interchangeably referred to as user equipment (UE)) are now equipped with multiple radio modules and are capable of handling multi-RAT's operations, such as at least two of GSM/GPRS/EDGE (Global System for Mobile Communications/General Packet Radio Service/Enhanced Data rates for Global Evolution), WCDMA (Wideband Code Division Multiple Access), cdma2000, WiMAX (Worldwide Interoperability for Microwave Access), TD-SCDMA (Time Division Synchronous Code Division Multiple Access), LTE (Long Term Evolution), and TD-LTE (Time Division Long Term Evolution) RATs, or the like via one communications apparatus.

As discussed above, the communications apparatus 100 may further be extended to comprise more than one antenna and/or more than one radio module. In another aspect of the invention, for either the single radio module or the multiple radio modules' applications, the methods as described above may also be utilized to further improve communications efficiency and quality since unnecessary cell measurement and cell reselection may be prevented.

Figure 6A:
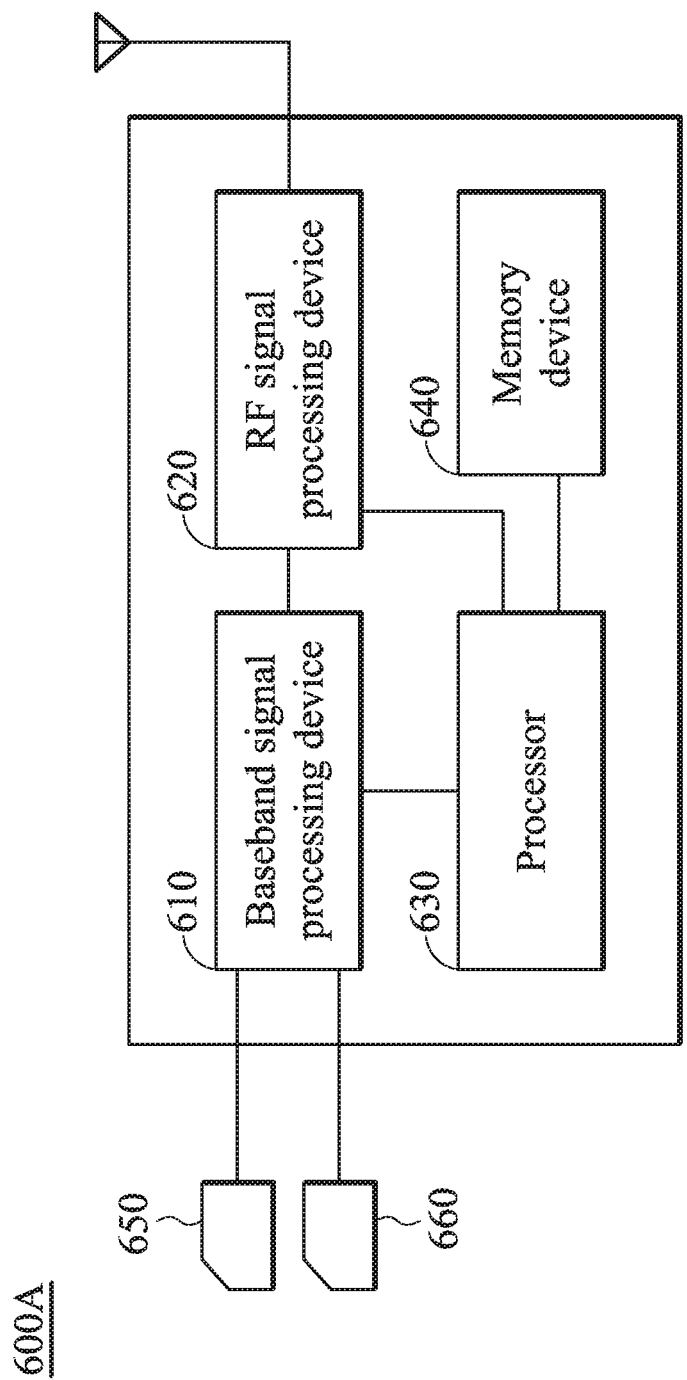
FIG. 6A shows a communications apparatus capable of providing multiple wireless communications services according to an embodiment of the invention

FIG. 6A shows a communications apparatus capable of providing multiple wireless communications services according to an embodiment of the invention. The communications apparatus 600A may be a notebook, a cellular phone (such as the MS or UE described above), a portable gaming device, a portable multimedia player, a Global Positioning System (GPS), a receiver, a personal digital assistant, a tablet computer, or another such device. The communications apparatus 600A may comprise at least a baseband signal processing device 610, an RF signal processing device 620, a processor 630, a memory device 640, and an antenna module comprising at least one antenna.

Most of the elements shown in FIG. 6A are similar to FIG. 1, and thus the descriptions are omitted here for brevity.

In the embodiment of the invention, the communications apparatus 600A may further comprise at least two subscriber identity cards 650 and 660 coupled to the baseband signal processing device 610. The baseband signal processing device 610, the RF signal processing device 620 and the antenna module may be shared by the subscriber identity cards 650 and 660. Therefore, in this embodiment, the communications apparatus 600A may be regarded as comprising at least two radio modules, one may at least comprise the subscriber identity card 650, (all or part of) the baseband signal processing device 610 and (all or part of) the RF signal processing device 620, and the other may at least comprise the subscriber identity card 660, (all or part of) the baseband signal processing device 610 and (all or part of) the RF signal processing device 620. Each radio module supports one RAT communications, and the RATs supported by the radio modules may be different RATs or the same RAT, and the invention should not be limited to either case.

The subscriber identity cards 650 and 660 may be the SIM, USIM, R-UIM or CSIM card, or the like, and they typically contain user account information, an international mobile subscriber identity (IMSI), and a set of SIM application toolkit (SAT) commands. They may provide storage space for phone book contacts. Note that the subscriber identity cards 650 and 660 may be dedicated hardware cards as described above, or in some embodiments of the invention, they may be individual identifiers, numbers, addresses, or the like which are burned in the internal memory device of the communications apparatus and are capable of identifying individual communications entity that the corresponding radio module operates. Therefore, the invention should not be limited to what is shown in the figures.

According to an embodiment of the invention, the processor 630 may be arranged to execute the program codes of the corresponding software module of the radio modules. The processor 630 may maintain and execute the individual tasks, threads, and/or protocol stacks for the radio modules, so as to independently control the operations of the radio modules. In the preferred embodiments, two protocol stacks may be implemented to respectively handle the radio activities of the individual radio module. However, it is also possible to implement only one protocol stack to handle the radio activities of the radio modules at the same time, or implement more than one protocol stack to handle the radio activities of the radio modules at the same time, and the invention should not be limited thereto.

Note that, in order to clarify the concept of the invention, FIG. 6A presents a simplified block diagram in which only the elements relevant to the invention are shown. However, the invention should not be limited to what is shown in FIG. 6A.

Note also that in other embodiments of the invention, the communications apparatus capable of providing multiple wireless communications services may also be designed to have multiple baseband signal processing devices.

Figure 6B:
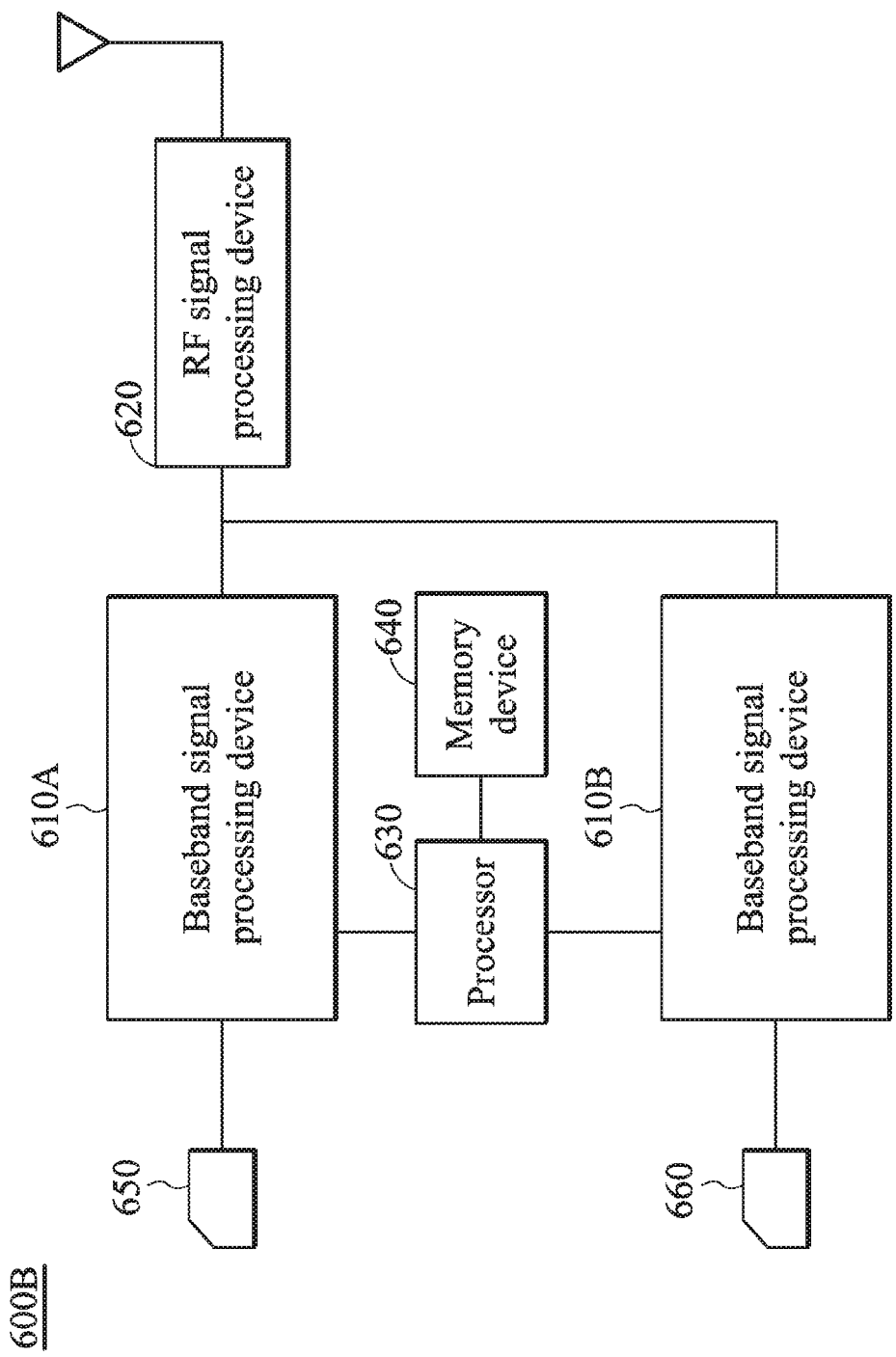
FIG. 6B shows a communications apparatus capable of providing multiple wireless communications services according to another embodiment of the invention.

FIG. 6B shows a communications apparatus capable of providing multiple wireless communications services according to another embodiment of the invention. The communications apparatus 600B may comprise at least the baseband signal processing devices 610A and 610B, an RF signal processing device 620, a processor 630, a memory device 640, an antenna module comprising at least one antenna and subscriber identity cards 650 and 660. Most of the elements shown in FIG. 6B are similar to FIG. 6A, and thus the descriptions are omitted here for brevity.

As the communications apparatus 600B shows in FIG. 6B, the communications apparatus 600B may be regarded as comprising at least two radio modules, one may at least comprise the subscriber identity card 650, the baseband signal processing device 610A and (all or part of) the RF signal processing device 620, and the other may at least comprise the subscriber identity card 660, the baseband signal processing device 610B and (all or part of) the RF signal processing device 620. Each radio module supports one RAT communications, and the RATs supported by the radio modules may be different RATs or the same RAT, and the invention should not be limited to either case.

Note also that in other embodiments of the invention, the communications apparatus capable of providing multiple wireless communications services may also be designed to have multiple processors.

Figure 6C:
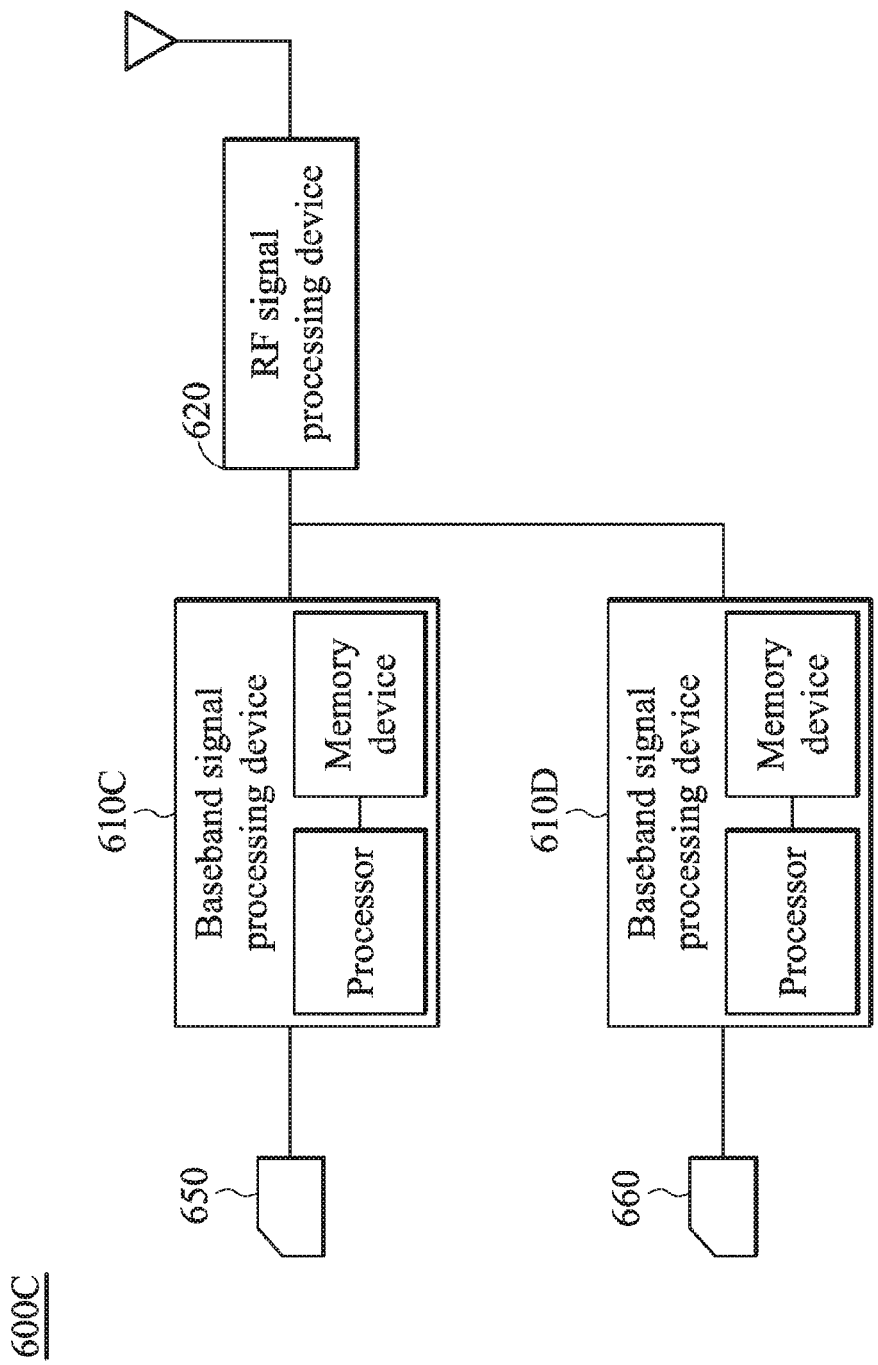
FIG. 6C shows a communications apparatus capable of providing multiple wireless communications services according to yet another embodiment of the invention.

FIG. 6C shows a communications apparatus capable of providing multiple wireless communications services yet according to another embodiment of the invention. The communications apparatus 600C may comprise at least the baseband signal processing devices 610C and 610D each comprising a processor and a memory device, an RF signal processing device 620, an antenna module comprising at least one antenna and subscriber identity cards 650 and 660. Most of the elements shown in FIG. 6C are similar to FIG. 6A, and thus the descriptions are omitted here for brevity.

As the communications apparatus 600C shows in FIG. 6C, the communications apparatus 600C may be regarded as comprising at least two radio modules, one may at least comprise the subscriber identity card 650, the baseband signal processing device 610C and (all or part of) the RF signal processing device 620, and the other may at least comprise the subscriber identity card 660, the baseband signal processing device 610D and (all or part of) the RF signal processing device 620. Each radio module supports one RAT communications, and the RATs supported by the radio modules may be different RATs or the same RAT, and the invention should not be limited to either case.

As the communications apparatus 600C shows in FIG. 6C, the processors and memory devices may be integrated in baseband processing devices 610C and 610D, respectively, and each processor may maintain and execute the task(s), thread(s), and//or protocol stack(s) for the corresponding radio module. Therefore, the invention should not be limited to either case.

Note further that although the communications apparatuses 600A, 600B and 600C shown in FIG. 6A to FIG. 6C support two RAT wireless communications services, the invention should not be limited thereto. Those who are skilled in this technology can still make various alterations and modifications based on the descriptions given above to derive the communications apparatuses capable of supporting more than two RAT wireless communications without departing from the scope and spirit of this invention.

Note further that, although in FIG. 6A to FIG. 6C, the RF signal processing device 620 and the antenna module are shared by multiple radio modules, the invention should not be limited thereto. Those who are skilled in this technology can still make various alterations and modifications based on the descriptions given above to derive the communications apparatuses comprising multiple RF signal processing device, multiple radio transceivers and/or multiple antenna modules for supporting multiple RAT wireless communications without departing from the scope and spirit of this invention.

In another aspect of the invention, the processor (e.g. the processor 130 shown in FIG. 1, the processor 630 shown in FIG. 6A or FIG. 6B, or at least one of the processors shown in FIG. 6C) may determine whether a first predetermined threshold value related to cell reselection is greater than a second predetermined threshold value related to cell measurement, and when the first predetermined threshold value is not greater than the second predetermined threshold value, the processor determines not to perform cell measurement on a predetermined neighbor cell and further determines to perform at least one radio activity instead in a predetermined period of time that is supposed to be utilized, or reserved for performing the cell measurement. In this embodiment, the Serving_signal_threshold_P or Serving_signal_threshold_Q introduced above represents the first predetermined threshold value related to cell reselection, and Search_threshold_for_low_priority_P or Search_threshold_for_low_priority_Q introduced above represents the second predetermined threshold value related to cell measurement.

Figure 7:
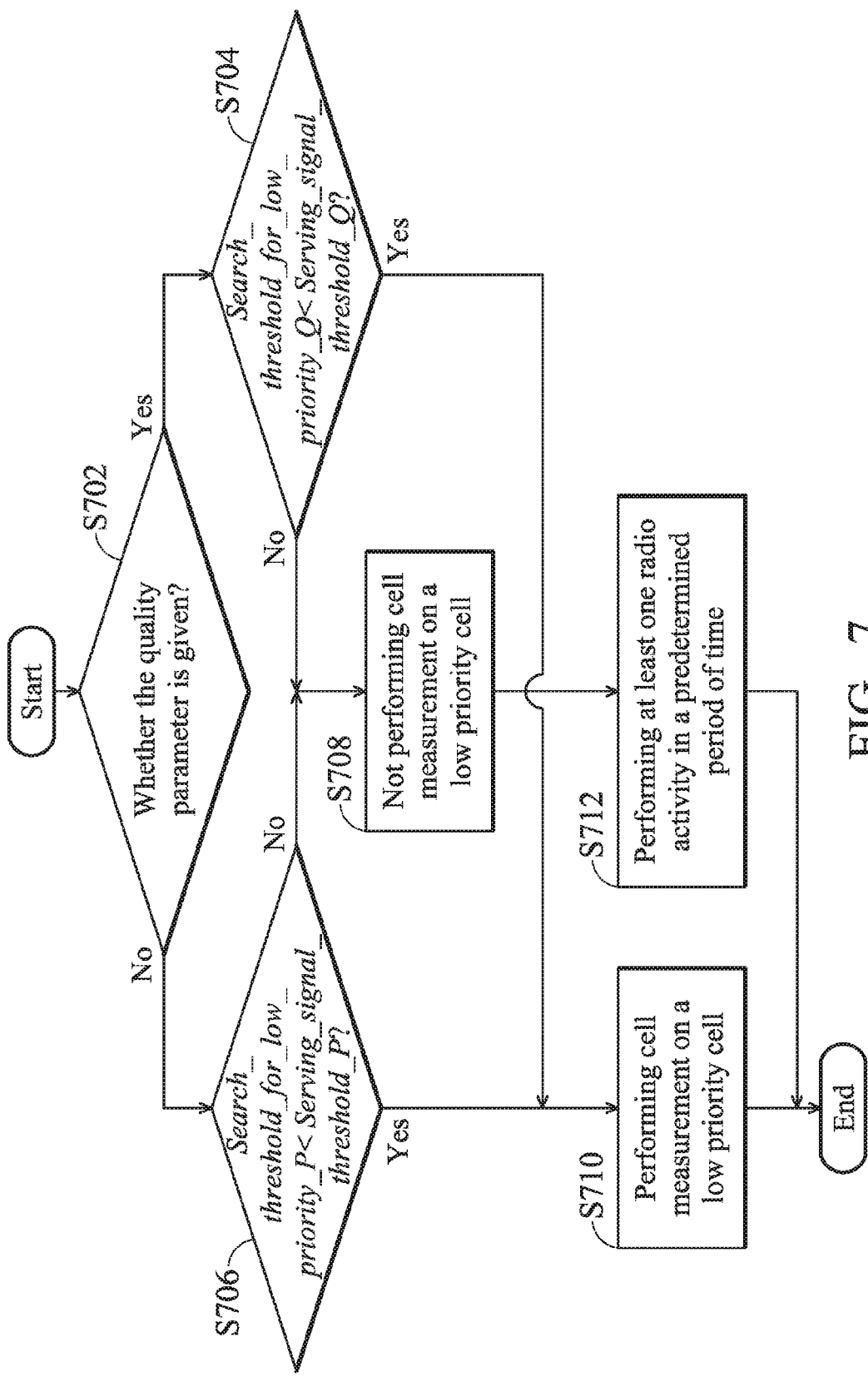
FIG. 7 shows a flow chart of a method for efficient wireless communications according to an embodiment of the invention.

FIG. 7 shows a flow chart of a method for efficient wireless communications according to an embodiment of the invention. When the processor has to determine whether to perform cell measurement on a low priority cell, the processor may first determine whether the quality parameter is given (Step S702). The quality parameter may be the threshold value of signal quality provided by the wireless network, such as the quality parameter Serving_signal_threshold_Q and/or Search_threshold_for_low_priority_Q as discussed above. When the quality parameter is given, the processor may further determine whether Search_threshold_for_low_priority_Q<Serving_signal_threshold_Q (Step S704). If so, the processor may determine to perform cell measurement on a low priority cell (Step S710). If not, the processor may determine not to perform cell measurement on a low priority cell (Step S708) and determine to perform at least one radio activity in a predetermined period of time that is supposed to be utilized, or reserved for performing the cell measurement (Step S712).

On the other hand, when the quality parameter is not given, the processor may determine whether Search_threshold_for_low_priority_P<Serving_signal_threshold_P (Step S706). If so, the processor may determine to perform cell measurement on a low priority cell (Step S710). If not, the processor may determine not to perform cell measurement on a low priority cell (Step S708) and determine to perform at least one radio activity in a predetermined period of time that is supposed to be utilized, or reserved for performing the cell measurement (Step S712).

The concept as discussed above may also be applied when performing the method for ping-pong avoidance as shown in FIG. 5. According to another embodiment of the invention, the processor (e.g. the processor 130 shown in FIG. 1, the processor 630 shown in FIG. 6A or FIG. 6B, or at least one of the processors shown in FIG. 6C) may determine whether the first predetermined threshold value related to cell reselection of cell A is greater than the third predetermined threshold value related to cell reselection of cell B, and when the first predetermined threshold value is greater than the third predetermined threshold value, the processor determines not to perform cell reselection to reselect to the predetermined neighbor cell and further determines to perform at least one radio activity instead in a predetermined period of time that is supposed to be utilized, or reserved for performing the cell reselection. In this embodiment, the Serving_signal_threshold_P or Serving_signal_threshold_Q introduced above represents the first predetermined threshold value related to cell reselection of cell A, and Threshold_to_reselect_to_higher_priority_P or Threshold_to_reselect_to_higher_priority_Q introduced above represents the third predetermined threshold value related to cell reselection of cell B.

Figure 8:
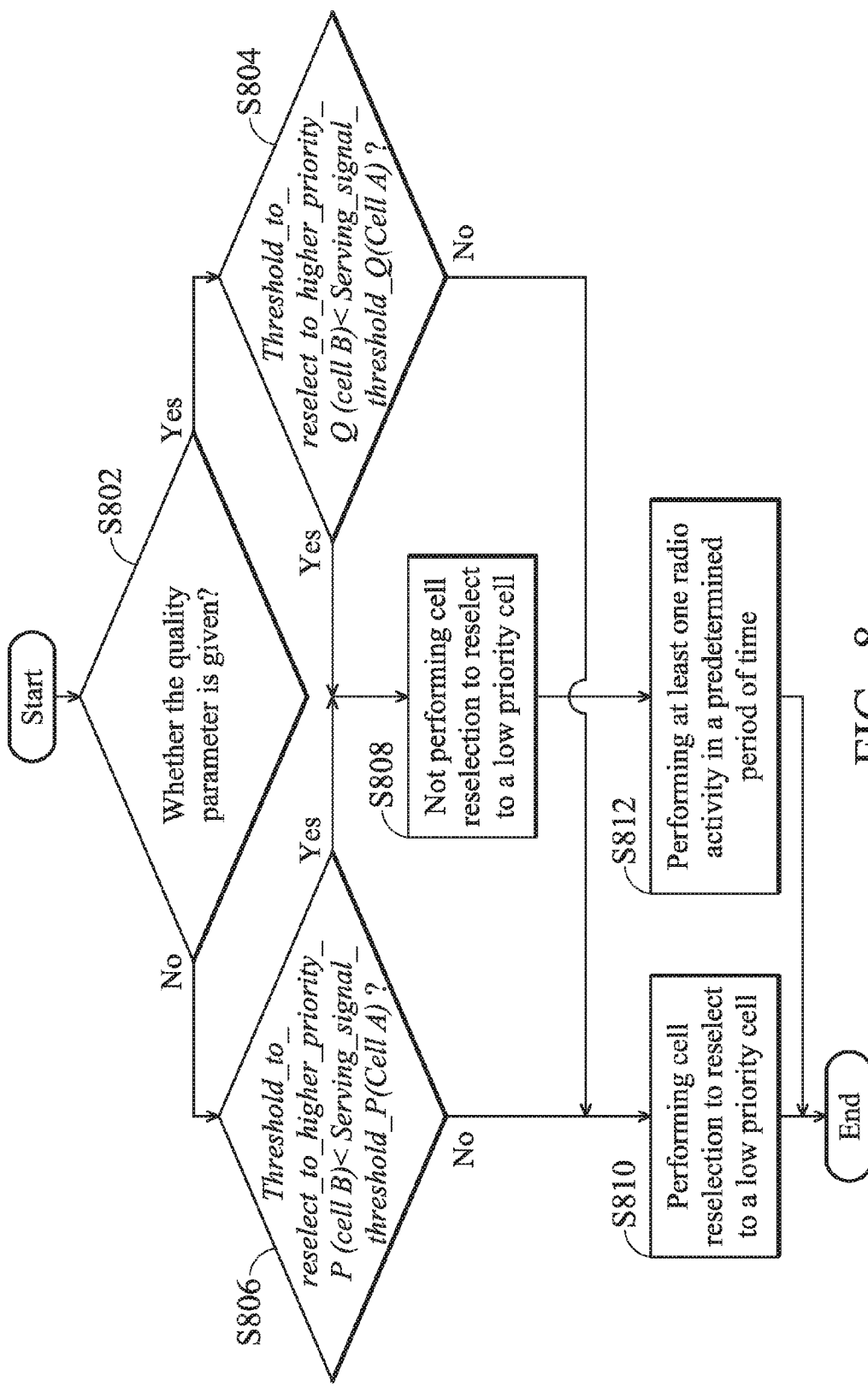
FIG. 8 shows a flow chart of a method for efficient wireless communications according to another embodiment of the invention.

FIG. 8 shows a flow chart of a method for efficient wireless communications according to another embodiment of the invention. When the cell reselection conditions to reselect to a low priority cell as defined by the communications standards are all satisfied, the processor may further determine whether the quality parameter is given (Step S802). The quality parameter may be the threshold value of signal quality provided by the wireless network, such as the quality parameter Serving_signal_threshold_Q and/or Threshold_to_reselect_to_higher_priority_Q as discussed above. When the quality parameter is given, the processor may further determine whether Threshold_to_reselect_to_higher_priority_Q (cell B)<Serving_signal_threshold_Q(Cell A) (Step S804). If so, the processor may determine not to perform cell reselection to reselect to a low priority cell (Step S808) and determine to perform at least one radio activity in a predetermined period of time that is supposed to be utilized, or reserved for performing the cell reselection (Step S812). If not, the processor may determine to perform cell reselection to reselect to a low priority cell (Step S810).

On the other hand, when the quality parameter is not given, the processor may determine whether Threshold_to_reselect_to_higher_priority_P (cell B)<Serving_signal_threshold_P(Cell A) (Step S806). If so, the processor may determine not to perform cell reselection to reselect to a low priority cell (Step S808) and determine to perform at least one radio activity in a predetermined period of time that is supposed to be utilized, or reserved for performing the cell reselection (Step S812). If not, the processor may determine to perform cell reselection to reselect to a low priority cell (Step S810).

In other words, based on the concept of the other aspect of the invention, when the processor determines not to perform cell measurement or cell reselection, the processor may determine to perform at least one radio activity instead of performing the cell measurement or cell reselection in the predetermined period of time that is supposed to be utilized, or reserved for performing the cell measurement or cell reselection. In this manner, the communications efficiency and quality can be improved further, since the predetermined period of time that is supposed to be utilized, or reserved for performing the cell measurement or cell reselection will not be wasted when the cell measurement or cell reselection is determined not to be performed.

According to an embodiment of the invention, the radio activity to be performed in the predetermined period of time may be measurement activity, data transmission/reception activity, or any channel activity for transmitting information to or receiving information from the wireless network. Since the wireless network often transmits or receives the information at a specific time according to the channel configuration, the channel activities may generally have to be performed at the specific time synchronized with the wireless network.

According to an embodiment of the invention, any radio activity to be performed in the predetermined period of time may be the radio activity of any radio module comprised in the communications apparatus. In an example, when the communications apparatus comprises at least a first radio module and a second radio module as discussed above, the radio activity to be performed in the predetermined period of time may be the radio activity of the first radio module or of the second radio module, regardless of which radio module the cell measurement or cell reselection is supposed to be performed by. Note that in the embodiments of the invention, the RF signal processing device may be shared by the first radio module and the second radio module as discussed above, or the communications apparatuses may comprise multiple RF signal processing devices so that the RF signal processing devices do not have to be shared by multiple radio modules.

Figure 9A:
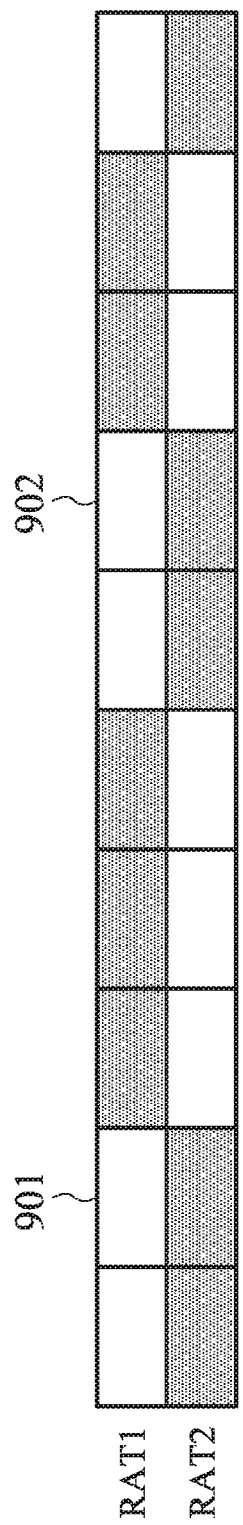
FIG. 9A is an exemplary timing diagram showing radio activities originally scheduled for two radio modules RAT1 and RAT2.
Figure 9B:
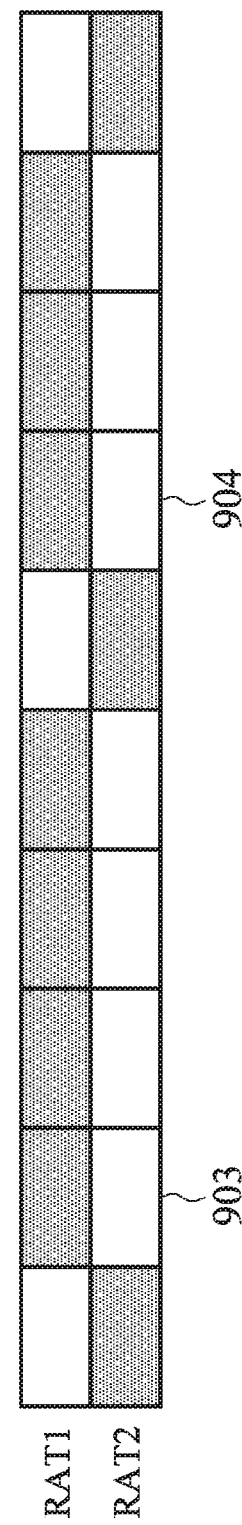
FIG. 9B is an exemplary timing diagram showing radio activities scheduled for two radio modules RAT1 and RAT2 after applying the proposed method according to an embodiment of the invention.

FIG. 9A is an exemplary timing diagram showing radio activities (the blocks without dots) originally scheduled for two radio modules RAT1 and RAT2. FIG. 9B is an exemplary timing diagram showing radio activities (the blocks without dots) scheduled for two radio modules RAT1 and RAT2 after applying the proposed method according to an embodiment of the invention. As shown in FIG. 9A, the periods 901 and 902 are supposed to be utilized or originally reserved for the radio module RAT 1 to perform cell measurement or cell reselection. However, when the processor determines not to perform cell measurement or cell reselection for the radio module RAT 1 as discussed above, the processor may yield the reserved periods for the radio module RAT 2 to perform its radio activities as shown in the periods 903 and 904 shown in FIG. 9B.

Figure 10A:
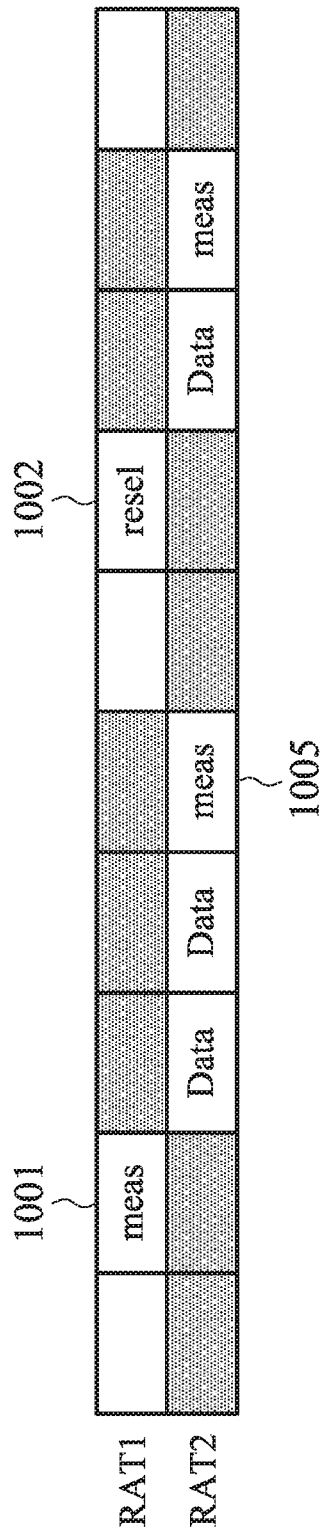
FIG. 10A is an exemplary timing diagram showing radio activities originally scheduled for two radio modules RAT1 and RAT2.
Figure 10B:
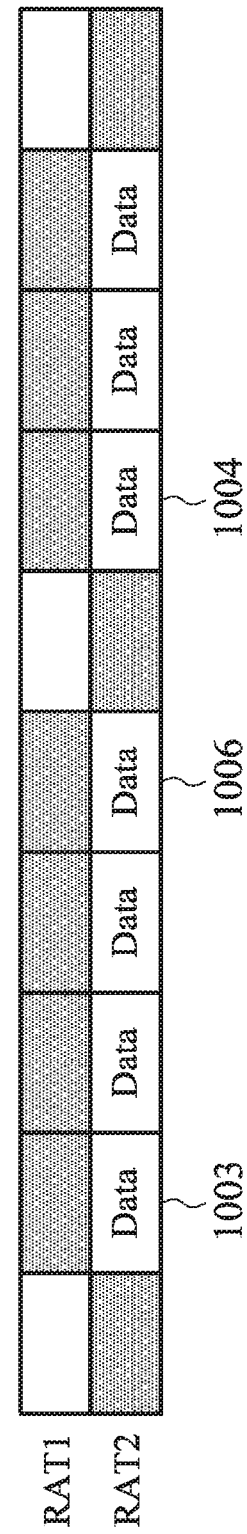
FIG. 10B is an exemplary timing diagram showing radio activities scheduled for two radio modules RAT1 and RAT2 after applying the proposed method according to another embodiment of the invention.

FIG. 10A is an exemplary timing diagram showing radio activities (the blocks without dots) originally scheduled for two radio modules RAT1 and RAT2. FIG. 10B is an exemplary timing diagram showing radio activities (the blocks without dots) scheduled for two radio modules RAT1 and RAT2 after applying the proposed method according to another embodiment of the invention. As shown in FIG. 10A, the periods 1001 and 1002 are supposed to be utilized or originally reserved for the radio module RAT 1 to perform cell measurement or cell reselection (such as the label 'meas' in the period 1001 and the label 'resel' in the period 1002 shown in FIG. 10A). However, when the processor may determine not to perform cell measurement or cell reselection for the radio module RAT 1 as discussed above, the processor may yield the reserved periods for the radio module RAT 2 to perform its data transmission activities, such as the label 'Data' in the periods 1003 and 1004 shown in FIG. 10B.

In addition, the period 1005 is supposed to be utilized or originally reserved for the radio module RAT 2 to perform cell measurement (such as the label 'meas' in the period 1005 shown in FIG. 10A) or cell reselection. However, when the processor determines not to perform cell measurement or cell reselection for the radio module RAT 2 as discussed above, the processor may yield the reserved period for the radio module RAT 2 to perform its data transmission activities, such as the label 'Data' in the period 1006 shown in FIG. 10B.

In this manner, the communications efficiency and quality can be further improved since the predetermined period of time that is supposed to be utilized, or reserved for performing the cell measurement or cell reselection will not be wasted and will be utilized more efficiently when the cell measurement or cell reselection is determined not to be performed.

In yet another aspect of the invention, instead of directly determining not to perform the cell reselection to reselect to a low priority cell as shown in Step S508 or S808, the processor (e.g. the processor 130 shown in FIG. 1, the processor 630 shown in FIG. 6A or FIG. 6B, or at least one of the processors shown in FIG. 6C) may determine whether the signal quality Squal or power Srxlev of the serving cell is greater than the third predetermined threshold value related to cell reselection of a predetermined neighbor cell.

Here, the predetermined neighbor cell is a low priority cell on a frequency having a reselection priority that is lower than that of a frequency of the serving cell. In addition, the communications apparatus currently camps on the cell A, and the Threshold_to_reselect_to_higher_priority_P or Threshold_to_reselect_to_higher_priority_Q introduced above represents the third predetermined threshold value related to cell reselection of a low priority neighbor cell B.

When the signal quality Squal or power Srxlev of the serving cell is not greater than the third predetermined threshold value, the processor further determines whether to perform cell measurement on the predetermined neighbor cell. In an embodiment of the invention, the processor may directly determine to perform cell measurement on the predetermined neighbor cell.

In addition, when the processor determines to perform cell measurement on the predetermined neighbor cell, the processor further determines whether to reselect to the predetermined neighbor cell according to measurement results of the predetermined neighbor cell. In an embodiment of the invention, when the measurement cell results of the predetermined neighbor cell is good or satisfy some cell reselection conditions to reselect to a low priority cell as defined by the communications standards, the processor may determine to reselect to the predetermined neighbor cell.

Figure 11:
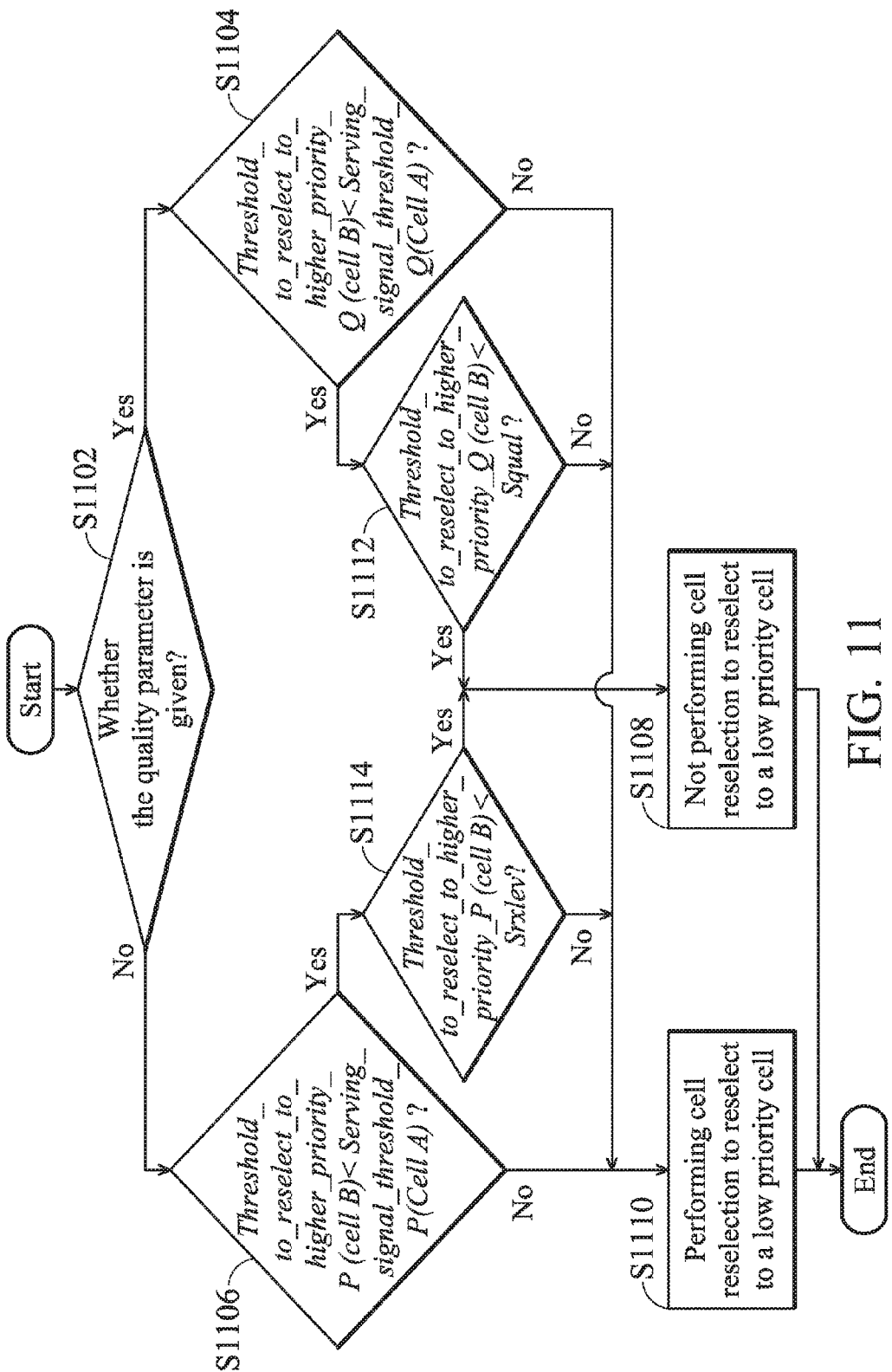
FIG. 11 shows a flow chart of a method for efficient wireless communications according to yet another embodiment of the invention.

FIG. 11 shows a flow chart of a method for efficient wireless communications according to yet another embodiment of the invention. The processor may first determine whether the quality parameter is given (Step S1102). The quality parameter may be the threshold value of signal quality provided by the wireless network, such as the quality parameter Serving_signal_threshold_Q and/or Threshold_to_reselect_to_higher_priority_Q as discussed above. When the quality parameter is given, the processor may determine whether Threshold_to_reselect_to_higher_priority_Q (cell B)<Serving_signal_threshold_Q(Cell A) (Step S1104). If not, the processor may determine to perform cell reselection to reselect to a low priority cell (Step S1110). If so, the processor may further determine whether Threshold_to_reselect_to_higher_priority_Q (cell B)<Squal (Step S1112). If so, the processor may determine not to perform cell reselection to reselect to a low priority cell (Step S1108) since in this condition, that is, the signal quality of cell A (the serving cell) is bad enough for cell A but not that bad enough for cell B, a reselection ping-pong would occurred. If not, the processor may further determine whether to perform cell measurement or cell reselection to reselect to a low priority cell. In an example, the processor may determine to perform cell reselection (which includes the cell measurement) to reselect to a low priority cell (Step S1110).

On the other hand, when the quality parameter is not given, the processor may determine whether Threshold_to_reselect_to_higher_priority_P (cell B)<Serving_signal_threshold_P(Cell A) (Step S1106). If not, the processor may determine to perform cell reselection to reselect to a low priority cell (Step S1110). If so, the processor may further determine whether Threshold_to_reselect_to_higher_priority_P (cell B)<Srxlev (Step S1114). If so, the processor may determine not to perform cell reselection to reselect to a low priority cell (Step S1108) since in this condition, that is, the signal power of cell A (the serving cell) is bad enough for cell A but not that bad enough for cell B, a reselection ping-pong would occurred. If not, the processor may further determine whether to perform cell measurement or cell reselection to reselect to a low priority cell. In an example, the processor may determine to perform cell reselection (which includes the cell measurement) to reselect to a low priority cell (Step S1110).

In this manner, the communications efficiency and quality can be further improved since it is flexible for the processor to determine whether to perform cell measurement or cell reselection when the signal quality or power of the serving cell is not greater than the threshold value utilized for determining whether to reselect to a cell having a priority higher than that of the low priority neighbor cell. When the processor determines not to perform the cell measurement or cell reselection, the predetermined period of time that is supposed to be utilized, or reserved for performing the cell measurement or cell reselection will be utilized more efficiently to perform at least one radio activity instead as discussed above.

The above-described embodiments of the present invention can be implemented in any of numerous ways. For example, the embodiments may be implemented using hardware, software or a combination thereof. It should be appreciated that any component or collection of components that perform the functions described above can be generically considered as one or more processors that control the above discussed function. The one or more processors can be implemented in numerous ways, such as with dedicated hardware, or with general purpose hardware that is programmed using microcode or software to perform the functions recited above.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed is:

1. A communications apparatus, camping on a serving cell, comprising:
   a radio frequency (RF) signal processing device, processing a plurality of RF signals to generate a plurality of baseband signals;
   a baseband signal processing device, processing the baseband signals; and
   a processor, measuring a signal quality or power of the serving cell and determining whether a first predetermined threshold value related to cell reselection of the serving cell is greater than a second predetermined threshold value related to cell reselection of a predetermined neighbor cell,
   wherein when the first predetermined threshold value is greater than the second predetermined threshold value, the processor further determines whether the signal quality or power of the serving cell is greater than the second predetermined threshold value, and
   when the signal quality or power of the serving cell is not greater than the second predetermined threshold value, the processor further determines whether to perform cell measurement on the predetermined neighbor cell.

2. The communications apparatus as claimed in claim 1, wherein when the processor determines to perform cell measurement on the predetermined neighbor cell, the processor further determines whether to reselect to the predetermined neighbor cell according to measurement results of the predetermined neighbor cell.

3. The communications apparatus as claimed in claim 1, wherein the predetermined neighbor cell is a low priority cell on a frequency having a reselection priority that is lower than that of a frequency of the serving cell, and wherein the first predetermined threshold value is a threshold value utilized for determining whether to reselect to a cell having a priority lower than that of the serving cell and the second predetermined threshold value is a threshold value utilized for determining whether to reselect to a cell having a priority higher than that of the predetermined neighbor cell.

4. A method for efficient wireless communications and performed by a communications apparatus camping on a serving cell, comprising:
   measuring a signal quality or power of the serving cell; and
   determining whether a first predetermined threshold value related to cell reselection is greater than a second predetermined threshold value related to cell reselection of a predetermined neighbor cell,
   wherein when the first predetermined threshold value is greater than the second predetermined threshold value, the method further comprises:
   determining whether the signal quality or power of the serving cell is greater than the second predetermined threshold value; and
   determining whether to perform cell measurement on the predetermined neighbor cell when the signal quality or power of the serving cell is not greater than the second predetermined threshold value.

5. The method as claimed in claim 4, wherein when it is determined to perform cell measurement on the predetermined neighbor cell, the method further comprises:
   determining whether to reselect to the predetermined neighbor cell according to measurement results of the predetermined neighbor cell.

6. The method as claimed in claim 4, wherein the predetermined neighbor cell is a low priority cell on a frequency having a reselection priority that is lower than that of a frequency of the serving cell1, and wherein the first predetermined threshold value is a threshold value utilized for determining whether to reselect to a cell having a priority lower than that of the serving cell and the second predetermined threshold value is a threshold value utilized for determining whether to reselect to a cell having a priority higher than that of the predetermined neighbor cell.

* * * * *